US012219972B2

(12) United States Patent
Hyzkihu

(10) Patent No.: US 12,219,972 B2
(45) Date of Patent: Feb. 11, 2025

(54) PLANT BASED READY TO CONSUME GEL PRODUCTS WITH NO ADDED SUGAR AND THEIR USE IN DELIVERY OF AGENTS

(71) Applicant: TOP GUM INDUSTRIES LTD, Stderot (IL)

(72) Inventor: Amit Hyzkihu, Modi'in (IL)

(73) Assignee: TOP GUM INDUSTRIES LTD, Stderot (IL)

(*) Notice: Subject to any disclaimer, the term of this patent is extended or adjusted under 35 U.S.C. 154(b) by 0 days.

(21) Appl. No.: 17/422,503

(22) PCT Filed: Feb. 21, 2021

(86) PCT No.: PCT/IL2021/050200
§ 371 (c)(1),
(2) Date: Jul. 13, 2021

(87) PCT Pub. No.: WO2021/165971
PCT Pub. Date: Aug. 26, 2021

(65) Prior Publication Data
US 2023/0146307 A1    May 11, 2023

Related U.S. Application Data

(60) Provisional application No. 63/034,430, filed on Jun. 4, 2020.

(30) Foreign Application Priority Data

Feb. 20, 2020 (IL) .......................................... 272833
Dec. 1, 2020 (TR) ................. 2020/19378

(51) Int. Cl.
    A23G 3/38    (2006.01)
    A23G 3/42    (2006.01)
    A23G 3/48    (2006.01)

(52) U.S. Cl.
    CPC ................. *A23G 3/48* (2013.01); *A23G 3/38* (2013.01); *A23G 3/42* (2013.01)

(58) Field of Classification Search
    CPC ..................................... A23G 3/42; A23G 3/38
    See application file for complete search history.

(56) References Cited

U.S. PATENT DOCUMENTS

| | | | |
|---|---|---|---|
| 6,951,661 B2 | 10/2005 | Roy et al. | |
| 8,501,262 B2 | 8/2013 | Bird et al. | |
| 10,555,543 B2 | 2/2020 | Choromanski et al. | |
| 2007/0172511 A1 | 7/2007 | Harrison et al. | |
| 2007/0212460 A1 | 9/2007 | Inoue et al. | |
| 2010/0104722 A1* | 4/2010 | Francisca ................. | A23G 3/38 426/573 |
| 2012/0003302 A1 | 1/2012 | Hidvégi | |
| 2015/0351422 A1 | 12/2015 | Kuhn | |
| 2016/0242450 A1* | 8/2016 | Magana ................. | A23L 29/20 |
| 2016/0296470 A1 | 10/2016 | Romanoschi et al. | |
| 2016/0302463 A1 | 10/2016 | Woodyer et al. | |

FOREIGN PATENT DOCUMENTS

| | | |
|---|---|---|
| CN | 101568265 A | 10/2009 |
| CN | 103037709 | 10/2013 |
| CN | 104382066 | 3/2015 |
| CN | 108850397 A | 11/2018 |
| DE | 20 2014 101690 | 5/2014 |
| EP | 1104652 | 6/2001 |
| EP | 2091346 | 8/2009 |
| GR | 1008155 | 3/2014 |
| WO | WO 2009/141074 | 11/2009 |
| WO | WO 2012/173587 | 12/2012 |
| WO | WO 2019/168594 | 6/2019 |
| WO | WO 2019/140403 | 7/2019 |
| WO | WO 2019/241146 | 12/2019 |

OTHER PUBLICATIONS

"Sour Blast Buddies" Anonymous; XP055875443 GNPD Mintel (Online) May 16, 2019.
TINTO: Carnauba Wax—an overview; ScienceDirect Jan. 1, 2017 p. 1, para 2-4; https://www.sciencedirect.com/topics/biochemistry-genetics-and-molecular-biology/carnauba-wax.
Sajilata et al; Specialty starches for snack foods ; Carbohydrate Polymers, Applied Science Publishers Ltd Barking GB vol. 59 No. 2 Jan. 10, 2005 pp. 131-151 XP 027721586.
IPRP in respect of PCT/IL2021/050200 issued Aug. 23, 2022.
International Search Report in respect of PCT/IL2021/050200 issued May 5, 2021.

* cited by examiner

*Primary Examiner* — Jenna A Watts
(74) *Attorney, Agent, or Firm* — Mark S. Cohen; PEARL COHEN ZEDEK LATZER BARATZ LLP

(57) ABSTRACT

The present invention relates to ready to consume gel confectionary food products having no added sugar or any stereoisomers thereof or any sugar substitutes, including methods of their preparation.

13 Claims, No Drawings

PLANT BASED READY TO CONSUME GEL PRODUCTS WITH NO ADDED SUGAR AND THEIR USE IN DELIVERY OF AGENTS

CROSS-REFERENCE TO RELATED APPLICATIONS

This application is a National Phase Application of PCT International Application No. PCT/IL2021/050200, International Filing Date 21 Feb. 2021, claiming priority from Israeli Patent Application No. 272833, filed 20 Feb. 2020, claiming the benefit of U.S. Patent Application No. 63/034, 430, filed 4 Jun. 2020, and claiming priority from Turkish Patent Application No. 2020/19378, filed 1 Dec. 2020, which are hereby incorporated by reference.

BACKGROUND OF THE INVENTION

In Central Europe, average body weight has constantly increased in adults, adolescents and children during the last four decades, a finding that is reflected by the global rise of overweight and obesity. Since 1980, obesity has doubled in more than 70 countries and is a major risk factor for several noncommunicable diseases (NCDs).

For years, there has been a public debate about dietary sugar intake and its role in the development of obesity and NCDs, including type 2 diabetes (T2D), cardiovascular diseases (CVDs), and cancer. There are several definitions of dietary sugars available; they include "added sugars", which are all sugars and syrups that are added to foods during processing and preparation, "free sugars" which according to the definition of the World Health Organization (WHO) comprise all mono- and disaccharides that are added to foods by the manufacturer, cook or the consumer as well as the sugars that are naturally present in honey, syrups, and fruit juices. The definition "total sugars" includes all sugars that naturally occur in food as well as added sugars. These definitions naturally include all monosaccharides (e.g., glucose, fructose, and galactose) and all disaccharides (e.g., sucrose, lactose, and maltose) (Prinz, P. The role of dietary sugars in health: molecular composition or just calories? *Eur J Clin Nutr.* 73, 1216-1223 (2019)).

Soft and chewable confectionaries (such as for example gummies) are commercially popular due to their mouthfeel and rate at which pleasant flavors of the confectionary are released into the mouth upon chewing. Such soft confectionaries include at least one sweetening agent, for example, a sugar-based product (e.g., sucrose) and/or a gelling agent (e.g., gelatin).

There is thus a need to provide food products, such as confectionary food items that are consumed by children or adults, that have no added sugars to them, however are not compromised with respect to taste and consistency of the product achieving a high compliance of consumption.

SUMMARY OF THE INVENTION

The present invention thus provides a food product comprising at least one plant-based fiber, at least one plant-based starch, at least one stable gel forming polysaccharide, at least one plant-based gelling agent, at least one buffer agent and water; wherein said food product has no added sugar or any stereoisomers thereof or any sugar substitutes and is a ready to consume gel confectionary product.

The present invention provides a food product comprising at least one plant-based fiber, at least one plant-based starch, at least one stable gel forming polysaccharide, at least one plant-based gelling agent, at least one buffer agent and water; wherein said food product is free of sugar or any stereoisomers thereof or any sugar substitutes and is a ready to consume gel confectionary product.

The present invention provides a food product comprising at least one plant-based fiber, at least one plant-based starch, at least one stable gel forming polysaccharide, at least one plant-based gelling agent, at least one buffer agent and water; wherein said food product comprises between 0 to 8% weight of sugar or any stereoisomers thereof or any sugar substitutes and is a ready to consume gel confectionary product.

When referring to a "plant-based fiber" it should be understood to encompass any type of dietary fiber that is derived, extracted or manufactured from a plant (fruit, vegetable or a combination thereof) or is synthetically or semi-synthetically manufactured to have a similar structure as the plant sourced fiber. Said fibers are plant-based carbohydrates which, unlike other carbohydrates (such as sugars and starch), is not digested in the small intestine and so reaches the large intestine or colon.

In some embodiments, said plant-based fiber source is selected from chicory root, algae, cassava root and any combinations thereof. In some other embodiments, said at least one plant-based fiber is selected from fructo-oligosaccharide (FOS), inulin, chicory root fibers, Isomaltooligosaccharide (IMO) and any combinations thereof.

In some embodiments, said at least one plant-based fiber is at least 60% of said product. In some embodiments, said at least one plant-based fiber is at least 70% of said product. In some embodiments, said at least one plant-based fiber is at least 80% of said product. In other embodiments, said at least one plant-based fiber is between 70% and 90% of said product. In other embodiments, said at least one plant-based fiber is between 80% and 90% of said product. In further embodiments, said at least one plant-based fiber is 60, 61, 62, 63, 64, 65, 66, 67, 6, 69, 70, 71, 72, 73, 74, 75, 76, 77, 78, 79, 80, 81, 82, 83, 84, 85, 86, 87, 88, 89 or 90% of said product. In some embodiments, said at least one plant-based fiber is at most 90% of said product.

The term "plant-based starch" encompasses any type of starch that is derived, extracted or manufactured from a plant (fruit, vegetable or a combination thereof) or is synthetically or semi-synthetically manufactured to have a similar structure as the plant sourced starch.

In some embodiments, said at least one plant-based starch is selected from tapioca starch, corn starch, potato starch, native corn starch, arrowroot, sago and any combinations thereof.

In some embodiments, said at least one plant-based starch is at least 0.01% of said product. In other embodiments, said at least one plant-based starch is between 0.01% and 5.0% of said product. In further embodiments, said at least one plant-based starch is 0.01, 0.02, 0.03, 0.04, 0.05, 0.06, 0.07, 0.08, 0.09, 0.1, 0.2, 0.3, 0.4, 0.5, 0.6, 0.7, 0.8, 0.9, 1, 1.1, 1.2, 1.3, 1.4, 1.5, 1.6, 1.7, 1.8, 1.9. 2, 2.1, 2.2, 2.3, 2.4, 2.5, 2.6, 2.7, 2.8, 2.9, 3, 3.1, 3.2, 3.3, 3.4, 3.5, 3.6, 3.7, 3.8, 3.9, 4, 4.1, 4.2, 4.3, 4.4, 4.5, 4.6, 4.7, 4.8, 4.9, 5% of said product. In some embodiments, said at least one plant-based starch is at most 5% of said product.

The term "gel forming polysaccharide" should be understood to encompass any type of polysaccharide that is capable of forming a stable soft solid or semi-solid gel material of two or more components, one of which is a liquid (for example water) present in substantial quantity. It is composed of crosslinked polymeric molecules to form tangled interconnected networks immersed in liquid medium. At the molecular level, gelation is the process which imparts stress resisting bulk character (solid properties) due to continuous framework of networks of polymer chains that extends throughout the gel phase.

In some embodiments, said at least one gel forming polysaccharide is selected from Agar Agar, Carrageenan, Gum Arabic, Guar gum, Xanthan gum, locust bean gum, and any combinations thereof.

In other embodiments, said at least one stable gel forming polysaccharide is at least 0.01% of said product. In further embodiments, said at least one stable gel forming polysaccharide is between 0.01 and 5% of said product. In further embodiments, said at least one stable gel forming polysaccharide is 0.01, 0.02, 0.03, 0.04, 0.05, 0.06, 0.07, 0.08, 0.09, 0.1, 0.2, 0.3, 0.4, 0.5, 0.6, 0.7, 0.8, 0.9, 1, 1.1, 1.2, 1.3, 1.4, 1.5, 1.6, 1.7, 1.8, 1.9. 2, 2.1, 2.2, 2.3, 2.4, 2.5, 2.6, 2.7, 2.8, 2.9, 3, 3.1, 3.2, 3.3, 3.4, 3.5, 3.6, 3.7, 3.8, 3.9, 4, 4.1, 4.2, 4.3, 4.4, 4.5, 4.6, 4.7, 4.8, 4.9, 5% of said product. In other embodiments, said at least one stable gel forming polysaccharide is at most 5% of said product.

In some embodiments, said at least one plant-based gelling agent is selected from pectin including but not limited to apple pectin, citrus pectin, and any combinations thereof.

It should be understood that said at least one plant-based gelling agent used in a product of the invention consists of at least one plant or parts thereof or is synthetically or semi-synthetically manufactured to have a similar structure as the plant sourced, and thus a product of the invention is devoid of any animal parts or products and is considered to be suitable for consumption of vegetarians and vegans.

In some embodiments, said at least one plant-based gelling agent is at least 1% of said product. In other embodiments, said at least one plant-based gelling agent is between 1 and 2% of said product. In further embodiments, said at least one plant-based gelling agent is 1, 1.1, 1.2, 1.3, 1.4, 1.5, 1.6, 1.7, 1.8, 1.9 or 2% of said product. In some embodiments, said at least one plant-based gelling agent is at most 2% of said product.

In some embodiments, at least one buffering agent is selected from Tri Sodium Citrate, Sodium Ascorbate and any combinations thereof.

In some other embodiments, said at least one emulsifying agent is at least 0.1% of said product. In other embodiments, said at least one emulsifying agent is between 0.1 and 0.5% of said product. In other embodiments, said at least one emulsifying agent is 0.1, 0.15, 0.2, 0.25, 0.3, 0.35, 0.4, 0.45 or 0.5% of said product. In some other embodiments, said at least one emulsifying agent is at most 0.5% of said product.

In some embodiments, said food product has water activity (aw) of between about 0.5 and 0.65. In other embodiments, said food product has aw of at least 0.50. In other embodiments, said food product has aw of at least 0.55. In other embodiments, said food product has aw of at least 0.60. In other embodiments, said food product has aw of at least 0.65.

The water activity (aw) of a food is the ratio between the vapor pressure of the food itself, when in a completely undisturbed balance with the surrounding air media, and the vapor pressure of distilled water under identical conditions. The moisture condition of a product can be measured as the equilibrium relative humidity (ERH) expressed in percentage or as the water activity expressed as a decimal.

The aw range of the product of the invention allows it to be stable under long term storage in ambient temperature (for 3 years) with minimal to substantially no growth of bacteria, yeasts, mold or any other microorganism.

In some embodiments, the ratio weight % between said at least one plant-based fiber and said at least one plant-based starch in a product of the invention is between about 80 to about 150.

In other embodiments, the ratio weight % between said at least one stable gel forming polysaccharide and said at least one plant-based gelling agent in a product of the invention is between about 1 to 5.

In other embodiments, the ratio between said at least one plant-based fiber and at least one stable gel forming polysaccharide in a product of the invention is between about 0.001 to about 0.01.

In other embodiments, the ratio weight % between said at least one plant-based fiber and at least one plant-based gelling agent in a product of the invention is between about 30 to 60.

In some embodiments, the ratio weight % between said at least one plant-based starch and at least one stable gel forming polysaccharide in a product of the invention is about 1 to 5.

In some embodiments, the ratio weight % between said at least one plant-based starch and at least one plant-based gelling agent in a product of the invention is between about 1 to 5.

In other embodiments, the ratio weight % between said at least one plant-based fiber and at least one buffer in a product of the invention is between about 0.001 to about 0.01.

In other embodiments, the ratio weight % between said at least one plant-based starch and at least one buffer in a product of the invention is between about 80 to about 150.

In other embodiments, the ratio weight % between said at least one stable gel forming polysaccharide and at least one buffer in a product of the invention is between about 0.5 to about 5.

In other embodiments, the ratio weight % between said at least one plant-based gelling agent and at least one buffer in a product of the present invention is between about 1 to 5.

The invention further provides a manufactured food product comprising one or more food product as disclosed herein above and below. Said manufactured food product of the invention may be baked, mixed, boiled, cooked, sautéed, steamed, fried, wrapped, extruded, extracted or any type of food manufacturing process. Said manufactured food product may be solid, liquid, semi-solid, spreadable food product. Non-limiting examples of manufactured food product that comprise a food product of the invention includes juice, yogurt, non-dairy yogurt, tofu, cheese, mayonnaise, peanut butter, chocolate, candy, chocolate spread, cake, cookie, and so forth.

A food product or product of the present invention is a ready to consume (i.e. no need for further preparation or treatment before consuming a product of the present invention) chewable-gel confectionary product may be any kind of edible product, including but not limited to a candy, a gummy candy, a gum, a chewable snack, a chewable candy, a dissolvable oral strip and so forth. In some embodiments, a ready to consume gel confectionary product of the invention has a homogeneous consistency. In other embodiments, a ready to consume gel confectionary product of the invention comprises at least two ready-to-consume gel confectionary products of the invention.

The invention further provides a product comprising at least one plant-based fiber, at least one plant-based starch, at least one stable gel forming polysaccharide, at least one plant-based gelling agent, at least one emulsifying agent, at least one active agent and water; wherein said product has no added sugar or any stereoisomers thereof or any sugar substitutes and is a ready to consume gel confectionary product.

Thus, a product of the invention is capable to deliver said at least one active agent to a subject in need thereof, by consuming said gel confectionary product, having a pleasant taste and agreeable consistency.

In some embodiments, said at least one active agent is selected from: a pro-biotic agent, a dietary supplement agent, an anti-inflammatory agent, an anti-oxidizing agent, a pharmaceutically active agent and any combinations thereof. In some embodiments, said at least one active agent is a vitamin, a NSAID, CBD, cannabis extract, omega 3, herbal oil, and any combination thereof.

In some embodiments, said at least one active agent is at least 0.01% of said product. In other embodiments, said at least one active agent is between 0.01 and 30% of said product. In other embodiments, said at least one active agent is 0.01, 0.02, 0.03, 0.04, 0.05, 0.06, 0.07, 0.08, 0.09, 0.1, 0.2, 0.3, 0.4, 0.5, 0.6, 0.7, 0.8, 0.9, 1, 2, 3, 4, 5, 6, 7, 8, 9, 10, 11, 12, 13, 14, 15, 16, 17, 18, 19, 20, 21, 22, 23, 24, 25, 26, 27, 28, 29 or 30% of said product.

A food product or a product of the present invention said food product has no added sugar or any stereoisomers thereof or any sugar substitutes. A food product or a product of the present invention said food product is sugar free including any stereoisomers thereof or any substitutes thereof.

When referring to a food product of the invention having no added sugar or any stereoisomer thereof or being sugar free, it should be understood to relate to such product excluding from its composition any type of mono- and/or di-saccharide, or any natural or unnatural stereoisomers thereof, up to and not exceeding 8% by weight of the product. In some embodiments, a product of the invention comprises 0-8% by weight mono- and/or di-saccharide of the product. In some embodiments, a product of the invention comprises 0-3% by weight mono- and/or di-saccharide of the product. In some embodiments, a product of the invention comprises 0-1% by weight mono- and/or di-saccharide of the product. In some embodiments, a product of the invention comprises 0-0.5% by weight mono- and/or di-saccharide of the product. In some embodiments, a product of the invention comprises 0-0.05% by weight mono- and/or di-saccharide of the product. In some embodiments, a product of the invention comprises 0-0.01% by weight mono- and/or di-saccharide of the product.

In some embodiments, said mono- and/or di-saccharide is a result of polysaccharide degradation product that is formed during the determination of the sugar profile of a product known in the food industry and regulation of food, for example in accordance with AOAC 977.20, thus under such embodiments, no sugar, its stereoisomers or substituents thereof is/are added during the manufacturing of the product.

Examples of such include but are not limited to D- and/or L-glucose, D- and/or L-fructose, D- and/or L-galactose, D- and/or L-sucrose, D- and/or L-isomaltulose, D- and/or L-trehalose, D- and/or L-psicose, D- and/or L-tagatose, D- and/or L-sorbose. It should be understood that no such type of sugar is added to the product in an amount that exceeds 8% weight of the product (in some embodiments 0-8% weight of the product), while being manufactured and thus, a product of the invention is substantially free of sugar or any stereoisomer thereof and any sugar substitutes.

When referring to food product of the invention having no added sugar substitute or any stereoisomer thereof it should be understood to relate to such product excluding from its composition any artificial food additive that provides a sweet taste like that of sugar while containing significantly less food energy than sugar-based sweeteners, making it a zero-calorie (non-nutritive) or low-calorie sweetener. Artificial sweeteners may be derived through manufacturing of plant extracts or processed by chemical synthesis. Examples of such include, but are not limited to acesulfame potassium, aspartame, cyclamate, mogrosides, saccharin, stevia, sucralose, sugar alcohols (erythritol, xylitol, and sorbitol).

Thus, the products of the present invention (excluding a manufactured product disclosed herein above) is defined to have (i) no amount of sugar, or any other ingredient that contains sugar or any stereoisomers thereof or any sugar substitutes that functionally substitute for added sugar, is added during processing or packaging, up to and not exceeding 8% weight of the product (in some embodiments 0-8% of the product); and/or (ii) the product does not contain an ingredient containing added sugars such as jam, jelly, or concentrated fruit juice; and/or (iii) the sugars content has not been increased above the amount present in the ingredients by some means such as the use of enzymes, except where the intended functional effect of the process is not to increase the sugars content of a food, and a functionally insignificant increase in sugars results.

In some embodiments, a product considered to exclude from its composition any type of sugar (mono- and/or di-saccharide), or any natural or unnatural stereoisomers thereof or substituted thereof comprises less than about 8% weight of sugar or substitutes thereof. In some embodiments, a product considered to exclude from its composition any type of sugar (mono- and/or di-saccharide), or any natural or unnatural stereoisomers thereof or substituted thereof comprises 0 to 8% weight of sugar or substitutes thereof. In some embodiments, a product considered to exclude from its composition any type of sugar (mono- and/or di-saccharide), or any natural or unnatural stereoisomers thereof or substituted thereof comprises 0 to 5% weight of sugar or substitutes thereof. In some embodiments, a product considered to exclude from its composition any type of sugar (mono- and/or di-saccharide), or any natural or unnatural stereoisomers thereof or substituted thereof comprises 0 to 1% weight of sugar or substitutes thereof. In some embodiments, a product considered to exclude from its composition any type of sugar (mono- and/or di-saccharide), or any natural or unnatural stereoisomers thereof or substituted thereof comprises 0 to 0.5% weight of sugar or substitutes thereof. In some embodiments, a product considered to exclude from its composition any type of sugar (mono- and/or di-saccharide), or any natural or unnatural stereoisomers thereof or substituted thereof comprises 0 to 0.1% weight of sugar or substitutes thereof. In some embodiments, a product considered to exclude from its composition any type of sugar (mono- and/or di-saccharide), or any natural or unnatural stereoisomers thereof or substituted thereof comprises 0 to 0.05% weight of sugar or substitutes thereof. In some embodiments, a product considered to exclude from its composition any type of sugar (mono- and/or di-saccharide), or any natural or unnatural stereoisomers thereof or substituted thereof comprises 0 to 0.01% weight of sugar or substitutes thereof.

In some embodiments, a product considered to exclude from its composition any type of sugar (mono- and/or di-saccharide), or any natural or unnatural stereoisomers thereof or substituted thereof comprises less than about 0.5 g of sugar or substitutes thereof.

In some embodiments, a product considered to exclude from its composition any type of sugar (monosaccharide), or any natural or unnatural stereoisomers thereof or substituted thereof comprises about less than 0.5, 0.4, 0.3, 0.2, 0.1, 0.09, 0.08, 0.07, 0.06, 0.05, 0.04, 0.03, 0.02, 0.01 g of sugar or substitutes thereof.

In some embodiments a product according to the invention has less than 0.5 g of sugar (per product weighing up to 6 gr). In some embodiments a product according to the invention has less than 0.5, 0.4, 0.3, 0.2, 0.1, 0.09, 0.08, 0.07, 0.06, 0.05, 0.04, 0.03, 0.02, 0.01 g of sugar (per product weighing up to 6 gr).

In some embodiments, a product of the invention further comprises at least one additional agent selected from a coloring agent, at least one flavoring agent, at least one fragrance, and any combinations thereof.

In some embodiments a product of the present invention has a pH of between about 2 to 4. In some embodiments a product of the present invention has a pH of about 2.0, 2.5, 3.0, 3.5, 4.0. In other embodiments a product of the present invention has a BX (Brix) of between about 70% to 85%. In other embodiments a product of the present invention has a BX (Brix) of about 70%, 71%, 72%, 73%, 74%, 75%, 76%, 77%, 78%, 79%, 805, 81%, 82%, 83%, 84%, 85%.

The invention further provides a process for the preparation of a food product of the invention, comprising the steps of: (a) preparing a homogenized mixture of at least one plant-based starch, at least one stable gel forming polysaccharide, at least one plant-based gelling agent and at least one buffering agent and water; (b) combining said homogenized mixture with at least one plant-based fiber; (c) forming a food product having no added sugar or any stereoisomers thereof or any sugar substitutes and is a ready to consume gel confectionary product.

DETAILED DESCRIPTION OF THE PRESENT INVENTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

General Procedure of Manufacturing of a Product of the Invention

Process for the preparation of a product of the invention: Step (a) a mixture of 5-30% water, 0.17%-0.40% buffer, 1.6-2.5% pectin, 0.01-5% Agar Agar, 0.01-1% tapioca starch. The mixture is heated to a temperature of 120 C for 10 minutes time. Step (b) 60-90% of fiber is added to the mixture. Step (c) the mixture with the plant-based fiber is vacuumed for 10 minutes time. Step (d) additional flavoring and coloring agents are added to the mixture from step (c) The resulting mixture is poured into a form.

Table 1 below provides typical examples of products manufactured according to the above general procedure.

TABLE 1

| Ingredient | #1 % | #2 % | #3 % | #4 % | #5 % | #6 % | #7 % | #8 % | |
|---|---|---|---|---|---|---|---|---|---|
| Chicory root fiber | 67.0 | 79.0 | 90.1 | 82.6 | 83.5 | 80.5 | 82.6 | 82.6 | Filler/Binder |
| Pectin | 1.8 | 1.8 | 1.8 | 0.9 | 2.3 | 1.8 | 1.8 | 1.8 | Gelling Agent |
| Trisodium citrate | 0.28 | 0.28 | 0.28 | 0.28 | 0.28 | 0.28 | 0.28 | 0.28 | Buffering agent |
| Agar Agar | 1.0 | 1.0 | 1.0 | 1.0 | 1.0 | 3.0 | 3.0 | 1.0 | Stabilizer |
| Tapioca Starch | 1.0 | 1.0 | 1.0 | 1.0 | 1.0 | 5.1 | 1.0 | 1.0 | Stabilizer |
| Water | 28.92 | 16.92 | 5.8 | 14.22 | 12.42 | 9.22 | 11.32 | 13.32 | |
| Total | 100.0 | 100.0 | 100.0 | 100.0 | 100.0 | 100.0 | 100.0 | 100.0 | |

Product Characteristics

1 Final product had high water content and less stable—Aw=0.78.

2 Final product had high water content and less stable—Aw=0.72.

3 Final product had too low water content and crystalized in the process before depositing. Texture of product was hard.

4 Final product did not gel, and the texture was soft. AW=0.68.

5 Final product had too low water content and crystalized in the process before depositing. Texture of product was hard. AW=0.65.

6 Final product did not gel, and the texture was soft.

7 The final product had non-homogeneous crystallizations.

8 The final product provided gel form confectionary product. AW=0.62

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

What is claimed is:

1. A food product comprising at least one plant-based fiber, at least one plant-based starch, at least one stable gel forming polysaccharide, at least one plant-based gelling agent, at least one buffer agent and water; wherein said food product is free of added sugar or any stereoisomers thereof and is free of any sugar substitutes; and is a ready to consume gel confectionary product.

2. The food product according to claim 1, wherein said at least one plant-based fiber is selected from fructo-oligosaccharide (FOS), inulin, chicory root fibers, isomaltooligosaccharide (IMO) and any combinations thereof.

3. The food product according to claim 1, wherein said at least one plant-based fiber is at least 60% of said product.

4. The food product according to claim 1, wherein said at least one plant-based starch is selected from tapioca starch, corn starch, potato starch, native corn starch, arrowroot, sago and any combinations thereof.

5. The food product according to claim 1, wherein said at least one plant-based starch is at least 0.01% of said product.

6. The food product according to claim 1, wherein said at least one stable gel forming polysaccharide is selected from agar agar, carrageenan, gum arabic, guar gum, xanthan gum, locust bean gum, and any combinations thereof.

7. The food product according to claim 1, wherein said at least one stable gel forming polysaccharide is at least 0.01% of said product.

8. The food product according to claim 1, wherein said at least one plant-based gelling agent is pectin.

9. The food product according to claim 1, wherein said at least one plant-based gelling agent is at least 1% of said product.

10. The food product according to claim 1, wherein said at least one buffering agent is selected from tri sodium citrate, sodium ascorbate and any combinations thereof.

11. The food product according to claim 1, further comprising at least one emulsifying agent being at least 0.1% of said product.

12. A product comprising at least one plant-based fiber, at least one plant-based starch, at least one stable gel forming polysaccharide, at least one plant-based gelling agent, at least one emulsifying agent, at least one active agent and water; wherein said product has is free of added sugar or any stereoisomers thereof and is free of any sugar substitutes and is a ready to consume gel confectionary product.

13. The product according to claim 12, wherein said at least one active agent is selected from: a pro-biotic agent, a dietary supplement agent, an anti-inflammatory agent, an anti-oxidizing agent, a pharmaceutically active agent and any combinations thereof.

* * * * *